(12) United States Patent
Tanaka (10) Patent No.: US 11,701,868 B2
(45) Date of Patent: Jul. 18, 2023

(54) CARBON FIBER REINFORCED PLASTIC STRUCTURE AND PROCESSING APPARATUS

(71) Applicant: Ushio Denki Kabushiki Kaisha, Tokyo (JP)

(72) Inventor: Yoneta Tanaka, Tokyo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 538 days.

(21) Appl. No.: 16/640,215

(22) PCT Filed: Aug. 2, 2018

(86) PCT No.: PCT/JP2018/029038
§ 371 (c)(1),
(2) Date: Feb. 19, 2020

(87) PCT Pub. No.: WO2019/054074
PCT Pub. Date: Mar. 21, 2019

(65) Prior Publication Data
US 2020/0361187 A1   Nov. 19, 2020

(30) Foreign Application Priority Data
Sep. 15, 2017   (JP) .................... 2017-177731

(51) Int. Cl.
*B32B 27/08*     (2006.01)
*B32B 27/38*     (2006.01)
*C08J 7/04*      (2020.01)

(52) U.S. Cl.
CPC .............. *B32B 27/08* (2013.01); *B32B 27/38* (2013.01); *C08J 7/04* (2013.01); *B32B 2260/046* (2013.01);
(Continued)

(58) Field of Classification Search
CPC .... C08J 7/042; C08J 5/042; C08J 7/04; B32B 15/08; B32B 2260/046; B32B 2305/08;
(Continued)

(56) References Cited

U.S. PATENT DOCUMENTS

2007/0101679 A1* 5/2007 Harthcock ........... B62D 29/002
52/782.1
2014/0311771 A1* 10/2014 Shimizu .............. H05K 1/0298
174/251
(Continued)

FOREIGN PATENT DOCUMENTS

EP       3095577 A1    11/2016
JP       H02-155723 A   6/1990
(Continued)

OTHER PUBLICATIONS

International Search Report issued in PCT/JP2018/029038; dated Oct. 30, 2018.
(Continued)

*Primary Examiner* — Alicia J Sawdon
(74) *Attorney, Agent, or Firm* — Studebaker & Brackett PC (57) ABSTRACT

A carbon fiber reinforced plastic structure has a low surface roughness and has reduced deformation due to residual stress, changes in temperature, etc., and a processing apparatus that uses the structure, are disclosed. The carbon fiber reinforced plastic structure (CFRP structure) includes a carbon fiber reinforced plastic member (CFRP member), and a resin layer formed on a first surface of the carbon fiber reinforced plastic member, the resin layer including an opposite surface that is opposite to a surface facing the first surface, the opposite surface having a surface roughness that is less than a surface roughness of the first surface of the carbon fiber reinforced plastic member.

4 Claims, 4 Drawing Sheets

(52) U.S. Cl.
CPC ....... *B32B 2305/08* (2013.01); *B32B 2311/12* (2013.01); *B32B 2311/24* (2013.01); *B32B 2311/30* (2013.01); *B32B 2313/04* (2013.01); *B32B 2363/00* (2013.01)

(58) Field of Classification Search
CPC .............. B32B 2311/12; B32B 2311/24; B32B 2311/30; B32B 2313/04; B32B 2363/00; B32B 27/08; B32B 27/38; B32B 5/28; B32B 27/20; B32B 5/26
See application file for complete search history.

(56) References Cited

U.S. PATENT DOCUMENTS

| | | | | |
|---|---|---|---|---|
| 2015/0192836 | A1* | 7/2015 | Matsuda | G03B 9/42 428/113 |
| 2016/0332389 | A1* | 11/2016 | Tachon | B32B 27/12 |
| 2017/0157804 | A1 | 6/2017 | Takemoto et al. | |
| 2017/0359891 | A1* | 12/2017 | Gozu | H01L 21/4857 |

FOREIGN PATENT DOCUMENTS

| | | |
|---|---|---|
| JP | H03-150136 A | 6/1991 |
| JP | H07-100844 A | 4/1995 |
| JP | H11-264906 A | 9/1999 |
| JP | 2001-291757 A | 10/2001 |
| JP | 2001-323089 A | 11/2001 |
| JP | 2001323089 A * | 11/2001 |
| JP | 2009-248398 A | 10/2009 |
| KR | 10-2012-0118799 A | 10/2012 |
| WO | 2015/107903 A1 | 7/2015 |

OTHER PUBLICATIONS

Suzanne Gill; "Magnetic levitation for PCB production"; Control Engineering; Aug. 9, 2015; pp. 1-7; XP055710148; URL:https://www.controleng.com/articles/magnetic-levitation-for-pcb-production. [retrieved on Jun. 30, 2020].

The extended European search report issued by the European Patent Office dated Jul. 10, 2020, which corresponds to European Patent Application No. 18856982.6-1102 and is related to U.S. Appl. No. 16/640,215.

An Office Action; "Notice of Reasons for Refusal", mailed by the Japanese Patent Office dated Mar. 16, 2021, which corresponds to Japanese Patent Application No. 2017-177731 and is related to U.S. Appl. No. 16/640,215; with English language translation.

* cited by examiner

CARBON FIBER REINFORCED PLASTIC STRUCTURE AND PROCESSING APPARATUS

TECHNICAL FIELD

The present invention relates to carbon fiber reinforced plastic structures containing carbon fiber reinforced plastics, and relates to processing apparatuses using such structures.

BACKGROUND ART

In a processing apparatus such as an exposure apparatus, it is desired that a stage for holding and moving a workpiece have characteristics, such as high specific rigidity, low density, and low thermal expansion coefficient. As a material satisfying these conditions, carbon fiber reinforced plastics (CFRPs) are known. CFRP is produced, for example, as follows:

First, carbon fibers are impregnated with a resin to prepare a plate-like (sheet-like) material called a prepreg. Next, multiple prepregs are molded by stacking them on a mold while considering the orientations of the fibers, and heating them under pressure using a vacuum bag, so that the prepregs are bonded to one another and are cured. Then, after cooling, the molded article is removed from the mold.

In recent years, an air-floating-type planar stage has been used as a stage of an exposure apparatus, etc. In the air-floating-type planar stage, a magnetic force is applied to a mobile object floating above the sliding surface by the action of air, and magnetic fields between the mobile object and the convex poles of the sliding surface are varied, so that the mobile object travels horizontally above the sliding surface. A planar stage having such a configuration is called a "surface motor stage", a "Sawyer motor stage", etc.

In such a planar stage, the surface roughness of the sliding surface must be, for example, 10 μm or less. This is because, in recent years, mobile objects are demanded to have higher rigidity, and in order to satisfy this demand, the gap (air bearing gap) between the mobile object and the sliding surface at the time of movement should be maintained at about several μm.

However, it is impossible to so reduce surface roughness of machined surfaces of CFRP materials. Specifically, CFRP materials can be processed only with a degree of precision of about 10 μm to 20 μm in arithmetic average roughness Ra. The reason is thought to be that the grinding requirements of carbon fibers and resin are different because of difference in rigidity. Accordingly, CFRP materials cannot be used alone as a sliding surface of a stage of an exposure apparatus, etc. Patent Document 1 (Japanese Patent Application Laid-Open Publication No. 2009-248398) discloses that a substrate stage (workpiece suction base) of an exposure apparatus includes a structure obtained by bonding a ceramic member to the surface of a CFRP member and processing the ceramic member by grinding, polishing, etc. In Patent Document 1 (Japanese Patent Application Laid-Open Publication No. 2009-248398), the adhesive force of uncured prepregs is used to bond the CFRP member and the ceramic member.

BACKGROUND DOCUMENTS

Patent Documents

Patent Document 1: Japanese Patent Application Laid-Open Publication No. 2009-248398

SUMMARY OF THE INVENTION

Problems to be Solved by the Invention

In the technique described in Patent Document 1 (Japanese Patent Application Laid-Open Publication No. 2009-248398), a laminate in which a ceramic member is disposed on an uncured prepreg disposed on the surface of a CFRP member is heated at about 120 degrees Celsius, so that a joined article of the ceramic member and the CFRP member is obtained.

However, the thermal expansion coefficient of CFRP and that of ceramics are different. Therefore, when the temperature is lowered after the heat treatment, as described above, residual stress occurs in the ceramic member adhered to the CFRP member. If there is residual stress in the ceramic member, during grinding of the surface of the ceramic member for increasing flatness precision, the balance of the stress may be lost as the ceramic member becomes thinner, and the ceramic member may be deformed.

In addition, due to the difference in the coefficients of thermal expansion, when the joined article of the ceramic member and the CFRP member are repeatedly exposed to changes in temperature over time, deformation or breakage in some cases at the joining surface may occur. Furthermore, in order to manufacture the joined article of the ceramic member and the CFRP member as described above, it is necessary to add the additional step of bonding the ceramic member in the middle of the step of manufacturing the CFRP member, which results in low productivity.

Accordingly, it is an object of the present invention to provide a carbon fiber reinforced plastic structure having low surface roughness and in which deformation due to residual stress, change in temperature, etc., is reduced, and to provide a processing apparatus using the structure.

Solution to Problems

In order to solve the above-described problems, an aspect according to the present invention provides a carbon fiber reinforced plastic structure including: a carbon fiber reinforced plastic member; and a resin layer formed on a first surface of the carbon fiber reinforced plastic member, the resin layer including an opposite surface that is opposite to a surface facing the first surface, the opposite surface having a surface roughness that is less than a surface roughness of the first surface of the carbon fiber reinforced plastic member.

Such a carbon fiber reinforced plastic structure has characteristics of carbon fiber reinforced plastic, such as high specific rigidity, low density, and low thermal expansion coefficient, and can have fine surface roughness (low surface roughness). Prepregs forming the carbon fiber reinforced plastic have a resin component. The layer formed on the first surface of the carbon fiber reinforced plastic member is a layer of the same kind of resin having a small difference in thermal expansion coefficient with that of the carbon fiber reinforced plastic and having excellent adhesion affinity for the carbon fiber reinforced plastic member, and therefore, residual stress can be reduced and deformation caused by change in temperature etc. over time is less likely to occur. Furthermore, since the carbon fiber reinforced plastic structure can be a laminate of a carbon fiber reinforced plastic member made of a completed product of carbon fiber reinforced plastic and a resin layer, no complicated manufacturing process is necessary, and productivity is improved.

In the carbon fiber reinforced plastic structure, the surface roughness of the resin layer may be 10 μm or less. In this case, it is possible to produce a carbon fiber reinforced plastic structure having a low surface roughness that cannot be realized by CFRP alone.

Furthermore, in the carbon fiber reinforced plastic structure, the resin layer may be made of a room temperature curable resin. In this case, in the resin layer, residual stress produced in the heat treatment can be reduced. Accordingly, it is possible to reduce deformation of the resin layer in surface processing, such as grinding.

The room temperature curable resin may be an epoxy resin. Epoxy resin is a common resin and is inexpensive. Therefore, by using an epoxy resin for the resin layer, a relatively inexpensive carbon fiber reinforced plastic structure can be produced.

Furthermore, the carbon fiber reinforced plastic structure may further include a third member made of a material different from those of the carbon fiber reinforced plastic member and the resin layer, the third member located on the first surface of the carbon fiber reinforced plastic member, the resin layer covering the entirety of a surface of the third member that is opposite to a surface facing the first surface.

Thus, a third member made of a material different from those of the carbon fiber reinforced plastic member and the resin layer can be provided on the first surface of the carbon fiber reinforced plastic member. In this case, the carbon fiber reinforced plastic structure can be used for a functional component, depending on various applications. The third member can be fixed to the first surface of the carbon fiber reinforced plastic member, for example, by being enclosed by the resin layer. In this case, the subject of surface processing, such as grinding, may be a portion of the resin layer enclosing the third member. Therefore, even if residual stress occurs in the third member, processing is not applied to the third member, and no deformation occurs.

Alternatively, the carbon fiber reinforced plastic structure may further include a third member made of a material different from those of the carbon fiber reinforced plastic member and the resin layer, the third member located on a part of the first surface of the carbon fiber reinforced plastic member, the resin layer being formed on the first surface such that a surface of the third member that is opposite to a surface facing the first surface of the third member is exposed.

Thus, a third member made of a material different from those of the carbon fiber reinforced plastic member and the resin layer can be provided on the first surface of the carbon fiber reinforced plastic member. In this case, the carbon fiber reinforced plastic structure can be used for a functional component depending on various applications. The third member can be exposed from the surface of the carbon fiber reinforced plastic structure and not be covered with the resin layer. In this case, surface processing, such as optical polishing and fine processing, can be directly applied to the surface of the third member. Furthermore, in a case in which an article is arranged to face a product in which the carbon fiber reinforced plastic structure is used, the article can face the third member without interposing the resin layer therebetween, so that the distance between the article and the product can be reduced.

Furthermore, in the carbon fiber reinforced plastic structure, the third member may be a metal member. That is, a metal member, made of, e.g., iron, aluminum, copper, brass, phosphor bronze, or stainless steel (SUS according to Japanese Industrial Standards) can be provided on the first surface of the carbon fiber reinforced plastic member. The material of the metal member can be appropriately selected depending on the application of the product (part) in which the carbon fiber reinforced plastic structure is used.

Furthermore, the metal member may include multiple metal portions arranged at equal intervals in a direction on the first surface, the resin layer being formed at least in clearances between the metal portions. In this case, regions of the magnetic material and regions of the nonmagnetic material can be provided on the surface of the carbon fiber reinforced plastic structure. Such a carbon fiber reinforced plastic structure can be used for a sliding surface of an air floating planar motor. In this case, a sliding surface can have fine surface roughness. Therefore, it is possible to produce a planar stage having a small air gap between the sliding surface and the mobile object to be floated above the sliding surface.

An aspect according to the present invention provides a method of producing a carbon fiber reinforced plastic structure, including the steps of: forming a resin layer on a first surface of a carbon fiber reinforced plastic member; and grinding an opposite surface of the resin layer that is opposite to a surface facing the first surface, whereby the opposite surface has a surface roughness that is less than a surface roughness of the first surface of the carbon fiber reinforced plastic member.

This can produce a carbon fiber reinforced plastic structure that has characteristics of carbon fiber reinforced plastic, such as high specific rigidity, low density, and low thermal expansion coefficient, and that can have fine surface roughness. Since the resin layer having a small difference in thermal expansion coefficient with that of the carbon fiber reinforced plastic is formed on the first surface of the carbon fiber reinforced plastic member, residual stress can be reduced and deformation caused by change in temperature etc. over time is less likely to occur in the structure. Furthermore, since a resin layer is stacked on the first surface of the carbon fiber reinforced plastic member made of a completed product of carbon fiber reinforced plastic, no complicated manufacturing process is necessary, and productivity is improved.

Furthermore, the method of producing a carbon fiber reinforced plastic structure may further include the step of locating a third member, made of a material different from those of the carbon fiber reinforced plastic member and the resin layer, on the first surface of the carbon fiber reinforced plastic member, the step of forming the resin layer including forming the resin layer above the first surface of the carbon fiber reinforced plastic member, on which the third member is located, and on the third member.

In this case, it is possible to manufacture a structure having a third member made of a material different from those of the carbon fiber reinforced plastic member and the resin layer that can be provided on the first surface of the carbon fiber reinforced plastic member. Consequently, it is possible to manufacture a structure that can form a functional component used depending on various applications.

An aspect according to the present invention provides a processing apparatus including a workpiece stage for holding and moving a workpiece, the processing apparatus processing the workpiece held on the workpiece stage, the workpiece stage including the above-described carbon fiber reinforced plastic structure.

Thus, by using the carbon fiber reinforced plastic structure for the workpiece stage, it is possible to make a lightweight workpiece stage with little deformation caused by external factors or change in temperature. In addition, the workpiece stage has a surface having fine surface roughness, used as, for example, a surface for holding a workpiece, or a surface facing an article in an air-floating-type planar stage. Therefore, by using the above-described carbon fiber reinforced plastic structure for such a surface, it is possible to provide a processing apparatus having an ideal workpiece stage.

Advantageous Effects of the Invention

According to the present invention, it is possible to provide a carbon fiber reinforced plastic structure having a low surface roughness and in which deformation due to residual stress, change in temperature, etc., is reduced.

The above-described objects, aspects, and advantages of the present invention, and objects, aspects, and advantages of the present invention that have not been described above, will be understood by those skilled in the art from the following description of embodiments (detailed description of the invention) with reference to the accompanying drawings and the claims.

DESCRIPTION OF EMBODIMENTS

Hereinafter, embodiments of the present invention will be described with reference to the drawings.

First Embodiment

Figure 1:
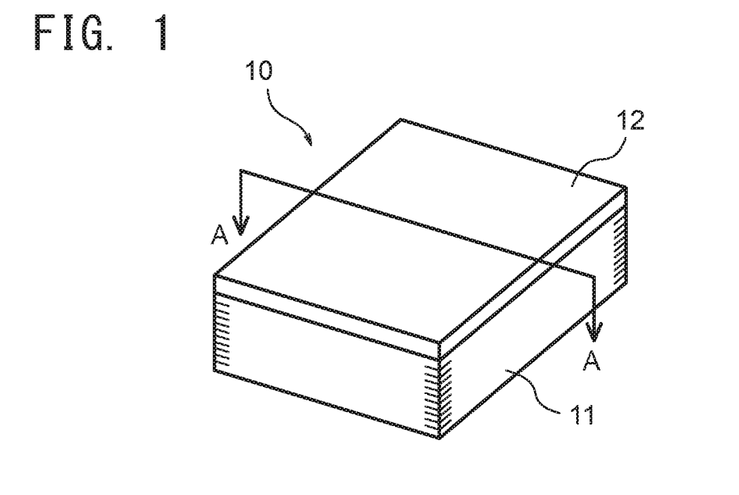
FIG. 1 is a perspective view of a carbon fiber reinforced plastic structure of a first embodiment.
Figure 2:
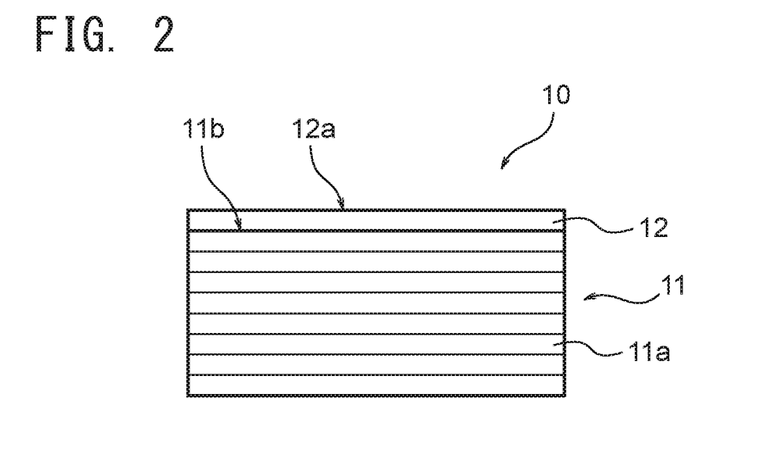
FIG. 2 is a cross-sectional view of the carbon fiber reinforced plastic structure of the first embodiment.

FIG. 1 is a perspective view showing a schematic configuration of a carbon fiber reinforced plastic structure (CFRP structure) 10 according to a first embodiment. FIG. 2 is a cross-sectional view of the CFRP structure 10 taken along line A-A in FIG. 1.

The CFRP structure 10 includes a carbon fiber reinforced plastic member (CFRP member) 11 and a resin layer 12 formed on the CFRP member 11.

As shown in FIG. 2, the CFRP member 11 includes multiple prepregs 11a laminated. The prepreg 11a is a sheet member in which a resin is impregnated in carbon fibers having directivity. The resin forming the prepreg 11a is, for example, a thermosetting epoxy resin. As another resin for forming the prepreg 11a, thermosetting resin, such as unsaturated polyester, a vinyl ester, a phenol, a cyanate ester, a polyimide, can also be used.

The CFRP is molded by stacking a predetermined number of layers (for example, twenty layers) of prepregs on a mold such that the orientations of the fibers are different in different prepregs, heating them at about 120 degrees Celsius to 130 degrees Celsius, and compressing them under reduced pressure, so that the prepregs are bonded with one another and cured. The reason for making the fiber directions in the stacked prepregs different is to strengthen the in-plane strength of the prepregs in an isotropic manner.

As a prepreg, it is possible to use a standard product having standard dimensions, for example, a UD (unidirectional) prepreg having a thickness of 5 mm, which can be stocked inexpensively. The UD prepreg is a prepreg in which the fibers extend in only one direction.

The CFRP produced in this manner is a high-strength material while having a lower density, i.e., is lighter than metal materials, such as iron and aluminum. The CFRP member 11 is a member obtained by cutting the completed CFRP sheet to a desired size.

The resin layer 12 is uniformly formed on a surface 11b (first surface) of the CFRP member 11. The surface roughness of the surface 12a (surface opposite to the surface facing the surface 11b) of the resin layer 12 is less than the surface roughness of the surface 11b of the CFRP member 11. In this specification, the surface roughness is an arithmetic average roughness Ra or a maximum height of profile Rz.

The resin layer 12 is formed by coating the surface 11b of the CFRP member 11 uniformly with a resin in liquid phase. After curing the resin, the surface 12a is ground so that the surface 12a of the cured resin has a surface roughness finer than that of the surface 11b of the CFRP 11. The preferable surface roughness of the surface 12a of the resin layer 12 is, for example, 10 µm or less in both arithmetic average roughness Ra and maximum height of profile Rz.

The resin layer 12 may be made of, for example, a room temperature curable resin. In the present embodiment, the resin layer 12 is made of a room temperature curable epoxy resin, but the kind of resin for forming the resin layer 12 is not limited to the embodiment.

Hereinafter, an example of a manufacturing method of the CFRP structure 10 in this embodiment will be described.

First, the CFRP member 11 is prepared by cutting a completed CFRP sheet to a necessary size.

Next, a room temperature curable resin in liquid phase is applied to the surface 11b of the CFRP member 11 and is cured at normal temperature without heating. At this time, for example, the CFRP member 11 is disposed within a container, and then the cavity between the surface 11b of the CFRP member 11 and the container is filled with the resin in liquid phase while vacuuming the container for preventing air bubbles from mixing in the resin layer. Then, the product is released to the atmosphere. The thickness of the resin layer 12 after curing is determined by the cavity, the viscosity of the liquid resin, etc. In the present embodiment, the thickness of the resin layer 12 after curing, but before grinding is, for example, about 100 µm.

Finally, the surface 12a of the cured resin layer 12 is ground. At this time, for example, the resin layer 12 having a thickness of 100 µm is ground to have a thickness of 50 µm, and the finished surface roughness of the surface 12a of the resin layer 12 is 10 µm or less.

Thus, the CFRP structure 10 is manufactured.

As described above, CFRP is a laminate of prepregs in which carbon fibers are impregnated with resin, and carbon fibers and resin differ in ease of processing because of difference in rigidity. That is, the grinding requirements of the carbon fiber and resin are different. Therefore, the surface roughness of CFRP cannot be made sufficiently low by grinding with respect to the carbon fibers used. Specifically, the precision achieved by machining can be at most about 10 μm to 20 μm in arithmetic average roughness Ra.

As a countermeasure, it is contemplated to reduce the surface roughness of molded CFRP by reducing the surface roughness of the surface of the mold for molding and press-hardening the prepregs that is in contact with the prepregs. However, this countermeasure has the following problems.

Since prepregs are heated to be cured during molding of CFRP, residual stress occurs in the prepregs of which the temperature was lowered after curing, which may result in undulation or bending (curvature) in the CFRP after removal from the mold. Accordingly, if the surface roughness of the mold used for molding CFRP is reduced, although the arithmetic average roughness Ra of the CFRP surface removed from the mold can be reduced, it is difficult to reduce the maximum height of profile Rz. In particular, when it is desired to produce a large and flat member using CFRP, the magnitude of undulation or bending (curvature) often exceeds the allowable numerical range. For example, although the arithmetic average roughness Ra can be reduced to about 2 μm, the maximum height of profile Rz sometimes exceeds 20 μm.

In order to modify the undulation or bending (curvature) into the allowable range, further processing for the CFRP surface is necessary. However, when the surface of CFRP is ground, the arithmetic average roughness Ra will be 10 μm or more, because of the difference in rigidity between the carbon fiber and resin. That is, the interfaces between the carbon fibers and the resin are exposed to the surface of the processed CFRP, and the surface roughness is deteriorated.

Thus, it was difficult to restrict both the arithmetic average roughness Ra and the maximum height of profile Rz of the surface of CFRP to 10 μm or less.

Accordingly, in this embodiment, instead of reducing the surface roughness of the mold used for molding the CFRP or grinding on the CFRP itself, a sacrificial layer that is easy to be processed is formed on a surface of a CFRP manufactured by a normal process, and the sacrificial layer is ground to obtain a CFRP structure 10 having fine surface roughness.

The CFRP structure 10 in the present embodiment includes the CFRP member 11 and the resin layer 12 formed on the surface 11b of the CFRP member 11, and the surface roughness of the surface 12a of the resin layer 12 is less than that of the surface 11b of the CFRP member 11. That is, the resin layer 12 is used for the sacrificial layer, so that it is possible to obtain a CFRP structure 10 having a fine surface roughness of 10 μm or less.

Since this CFRP structure 10 contains CFRP, it has characteristics such as high specific rigidity, low density, and low thermal expansion coefficient. Thus, the CFRP structure 10 has small dimensional deformation due to external factors, is lightweight, and also has small dimensional deformation due to changes in temperature.

The CFRP structure 10 in the present embodiment is formed by applying a resin to the surface of a CFRP member 11 obtained by cutting a CFRP sheet manufactured by a normal process to a necessary size, and curing the resin. Then, the surface of the resin layer 12 is ground. Therefore, it is not necessary to add an additional process in the middle of the process of manufacturing CFRP, so that the productivity is high.

Furthermore, the resin layer 12 is used as a sacrificial layer to be ground to have a fine surface roughness. Since the prepregs forming the CFRP member 11 contain a resin component, the difference in thermal expansion coefficient between the CFRP member 11 and the resin layer 12 at the contact surface of the CFRP member 11 and the resin layer 12 is small, and the adhesion affinity is excellent. Therefore, the residual stress is small, and even if the CFRP structure 10 is repeatedly exposed to the change in temperature over time, it is unlikely that deformation at the contact surface will occur.

Furthermore, the resin forming the resin layer 12 may be a room temperature curable resin. Since the room temperature curable resin does not need to be heated for curing, residual stress caused by heating does not occur inside the resin layer 12 after formation. If the sacrificial layer formed on the surface of the CFRP member 11 has residual stress, the balance of the stress may be lost due to thinning of the sacrificial layer during grinding of the sacrificial layer, and the sacrificial layer may be deformed. By using the resin layer 12 made of a room temperature curable resin as the sacrificial layer as in the present embodiment, it is possible to appropriately reduce the occurrence of the deformation.

The room temperature curable resin may be a room temperature curable epoxy resin. In this case, the resin layer 12 having the same component as the resin forming CFRP can also be used, so that the coefficient of thermal expansion of the CFRP member 11 and that of the resin layer 12 can be made more similar. Therefore, deformation is less likely to occur even when it is repeatedly exposed to changes in temperature over time. Furthermore, since the epoxy resin is a common resin and is relatively inexpensive, the CFRP structure 10 can be provided at low cost.

The CFRP structure 10 in this embodiment can be used in a processing apparatus. An example of a processing apparatus is an exposure apparatus that has a stage (workpiece stage) for holding and moving a substrate, and that exposes the substrate held on the stage.

For example, a stage of a step-and-repeat type exposure apparatus has surfaces for which fine surface roughness is needed, for example, a surface for holding the substrate, and a mirror for reflecting light from a laser interferometer for measuring the position of the stage. In addition, for such a stage, dimensional deformation due to external factors should be small, it should be light in weight, the movement speed should be high, the inertia force should be low to enable rapid stop and high precision positioning in a short time, and dimensional deformation due to changes in temperature should be small. These requirements can be satisfied appropriately by using the CFRP structure 10 in the present embodiment in the stage.

In the present embodiment, although the resin layer 12 is formed only on one surface of the CFRP member 11, multiple resin layers 12 may be formed on multiple surfaces (the surface opposite to the surface 11b and side surfaces) of the CFRP member 11, respectively.

In this embodiment, although the surface 12a of the resin layer 12 is flat, one or more grooves may be formed on the surface 12a of the resin layer 12. Furthermore, multiple resin layers 12 may be formed on one surface of the CFRP member 11.

Second Embodiment

Next, a second embodiment of the present invention will be described.

In the first embodiment described above, the CFRP structure includes the CFRP member and the resin layer. In the second embodiment, a CFRP structure includes a CFRP member, a resin layer, and a third member different from CFRP and resin will be described.

Figure 3:
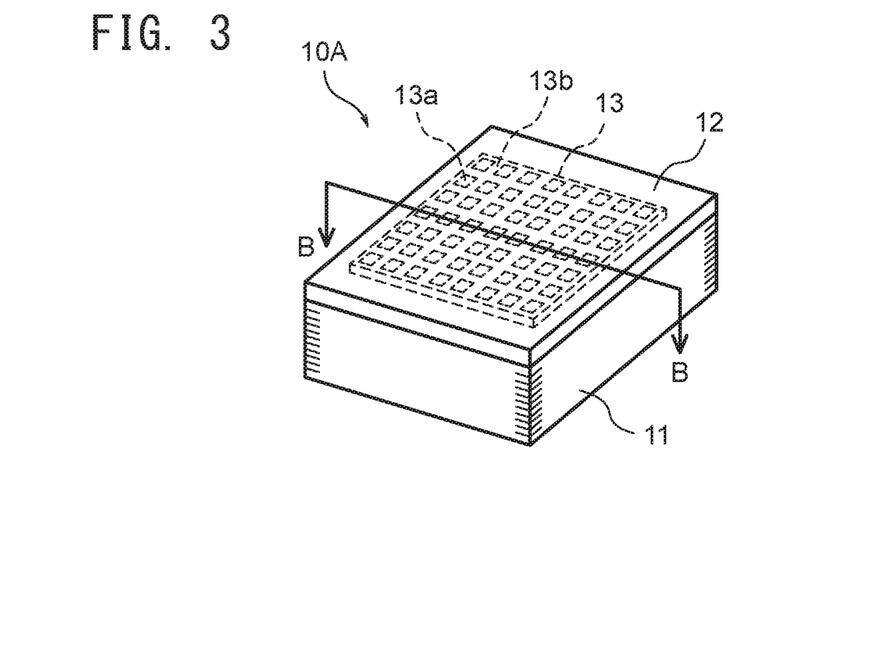
FIG. 3 is a perspective view of a carbon fiber reinforced plastic structure according to a second embodiment.
Figure 4:
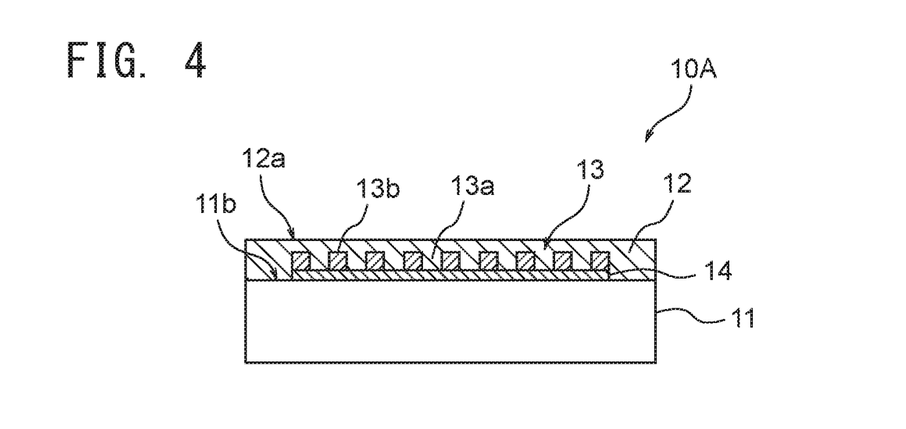
FIG. 4 is a cross-sectional view of the carbon fiber reinforced plastic structure according to the second embodiment.

FIG. 3 is a perspective view showing a schematic configuration of a CFRP structure 10A of the second embodiment. FIG. 4 is a cross-sectional view of the CFRP structure 10A taken along line B-B in FIG. 3.

The CFRP structure 10A includes a CFRP member 11, a metal member (metal plate) 13, which is a third member provided on the CFRP member 11, and a resin layer 12 provided above the CFRP member 11 so as to cover the metal plate 13.

Thus, in the present embodiment, the CFRP structure 10A has a configuration in which the metal plate 13 is disposed on the surface 11b of the CFRP member 11, and the metal plate 13 is enclosed in the resin layer 12. As shown in FIG. 4, the metal plate 13 is fixed to the surface 11b of the CFRP member 11 by an adhesive agent 14. In a manner similar to the first embodiment described above, the surface roughness of the surface 12a of the resin layer 12 is less than the surface roughness of the surface 11b of the CFRP member 11, and is, for example, 10 µm or less.

As shown in FIG. 4, the metal plate 13 has multiple apertures 13a arranged in a grid pattern. In other words, the metal plate 13 includes a metal lattice 13b. Furthermore, as shown in FIG. 4, the resin of the resin layer 12 penetrates into the apertures 13a of the metal plate 13. In the present embodiment, the material of the metal plate 13 is iron.

The CFRP structure 10A in the present embodiment can be used in an exposure apparatus including an air-floating-type planar stage (surface motor stage).

Figure 5:
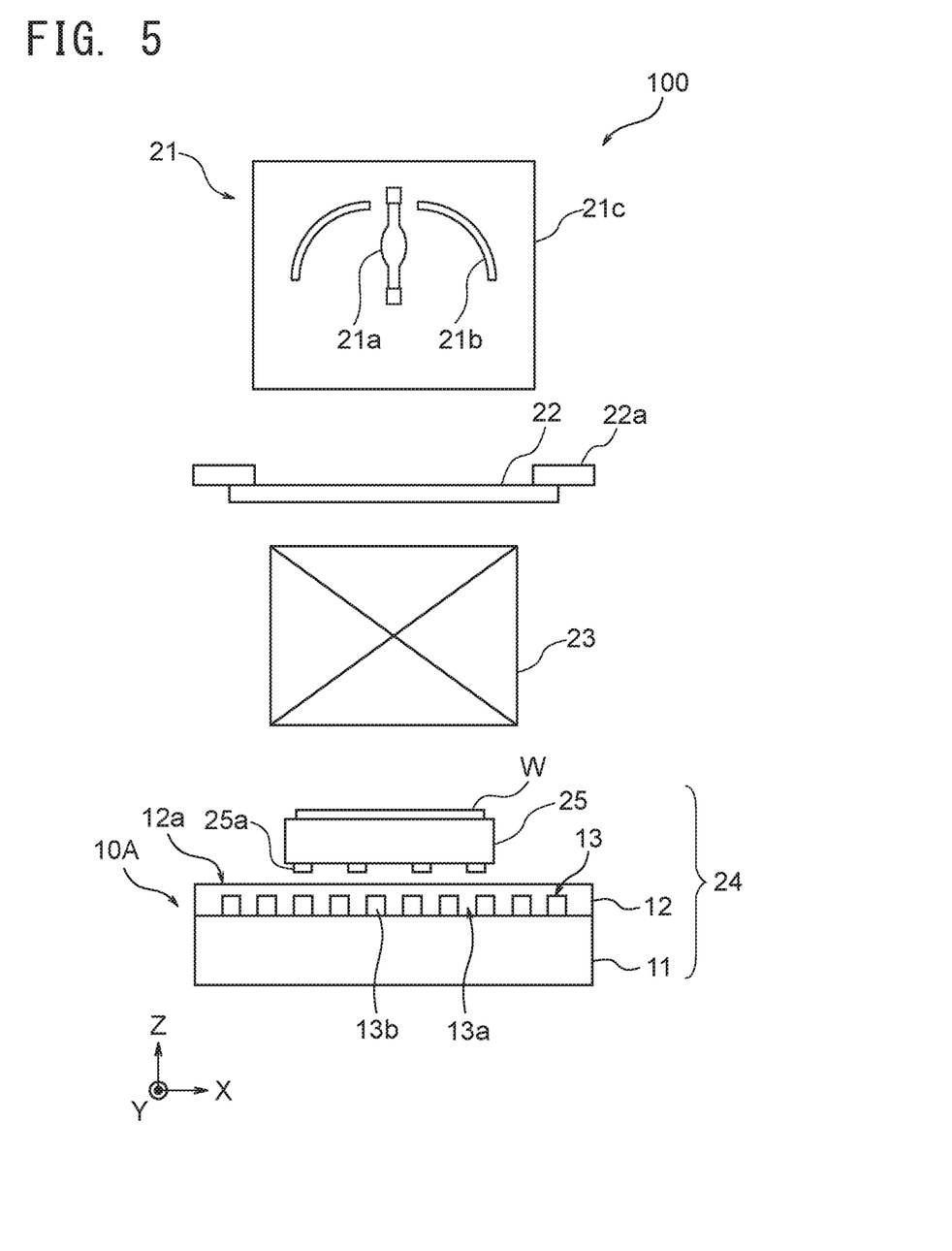
FIG. 5 is a view showing a schematic configuration of an exposure apparatus.

FIG. 5 is a view showing a schematic configuration of an exposure apparatus 100 using the CFRP structure 10A in the present embodiment.

The exposure apparatus 100 is a projection exposure apparatus that exposes a workpiece W. The workpiece W is, for example, a silicon workpiece, a printed circuit board, or a glass substrate for a liquid crystal panel. A resist film is applied to the surface of the workpiece W.

The exposure apparatus 100 includes a light irradiation unit 21, a mask 22, a mask stage 22a that holds the mask 22, a projection lens 23, and a workpiece stage 24.

The light irradiator 21 includes a lamp 21a, which is an exposure light source for emitting light including ultraviolet light, and mirrors 21b, which reflect the light from the lamp 21a. The lamp 21a and the mirrors 21b are contained in a lamp house 21c. Although the light source of the light irradiation part 21 is the lamp 21a, the light source may be an LED, a laser, etc.

The mask 22 includes a pattern formed therein. The pattern is, e.g., a circuit pattern, to be exposed (transferred) to the workpiece W. The mask 22 is held by the mask stage 22a in a horizontal state. The exposure light from the light irradiation unit 21 is irradiated on the workpiece W on the workpiece stage 24 after passing through the mask 22 and the projection lens 23, so that the pattern formed on the mask 22 is projected to expose the workpiece W.

The workpiece stage 24 is an air-floating-type planar stage.

The air-floating-type planar stage includes a sliding surface forming a horizontal surface, and a mobile object movable on the sliding surface in horizontal directions (X and Y directions). In this planar stage, the mobile object floats on air on a sliding surface provided with convex poles of a ferromagnetic material in a grid pattern aligned along the X and Y axes, and magnetic forces exerted between the mobile object and the convex poles in the sliding surface are varied to slide the mobile object in the X and Y directions on the sliding surface.

That is, the sliding surface includes stators of the planar motor, whereas the mobile object includes movers of the planar motor. In the specification, a planar motor refers to a motor that enables two-dimensional movement on a plane by arranging multiple one-dimensional motors on the plane.

In this embodiment, the surface 12a of the resin layer 12 in the CFRP structure 10A is used as the sliding surface. That is, the workpiece stage 24 includes a sliding surface including the CFRP structure 10A, and a mobile object 25 that holds the workpiece W and moves on the surface 12a of the CFRP structure 10A that is the sliding surface. The surface roughness of the surface 12a of the resin layer 12 is, for example, 5 µm.

The sliding surface has convex poles of a ferromagnetic material in a grid pattern aligned along the X and Y axes, and a nonmagnetic material located between the convex poles. Accordingly, the sliding surface has a structure in which regions of ferromagnetic material and regions of nonmagnetic material are alternately formed in the X direction and Y direction. In the present embodiment, the regions of the metal lattice 13b of the CFRP structure 10A are the regions of the ferromagnetic material, and the regions of the apertures 13a of the metal plate 13 are the regions of the nonmagnetic material. The metal portions of the metal lattice 13b are arranged at equal intervals in the X direction and the Y direction.

A motor core (not shown) to which magnetic forces are applied is provided on the reverse surface (the sliding surface side) of the mobile object 25. Magnetic poles 25a for generating magnetic fields in the X and Y directions for movement are provided on the surface of the motor core, the surface facing the sliding surface.

The workpiece W is held on the obverse surface of the mobile object 25 (surface on the side of the projection lens 23), and the workpiece W moves by moving the mobile object 25 on the sliding surface in order that desired areas of the workpiece W are exposed according to the pattern of the mask 22. The widths of the aperture 13a of the metal plate 13 and the metal lattice 13b in the X and Y directions are defined corresponding to the pitch of the magnetic poles 25a.

Figure 6A:
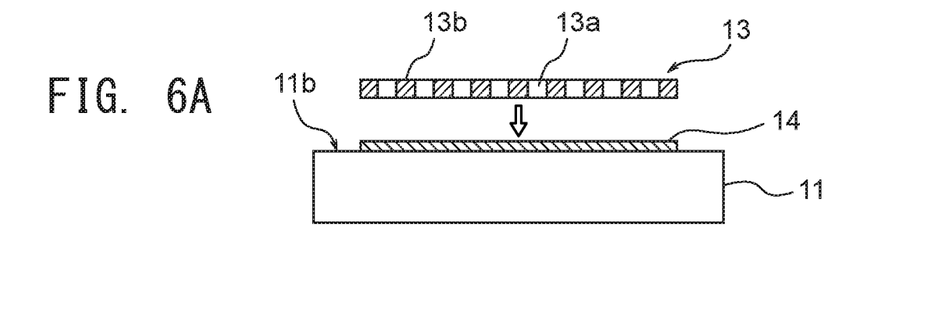
FIG. 6A is a view showing a method of producing a carbon fiber reinforced plastic structure.

Hereinafter, a method of manufacturing the CFRP structure 10A in the present embodiment will be described with reference to FIGS. 6A to 6C.

First, the CFRP member 11 is prepared by cutting a completed CFRP sheet to a necessary size. Then, as shown in FIG. 6A, the adhesive agent 14 is applied to the surface 11b of the CFRP member 11, and the metal plate 13, in which multiple aperture 13a were formed, is placed on the adhesive agent 14 (as indicated by the white arrow in FIG. 6A). Thus, the metal plate 13 is fixed to the surface 11b of the CFRP member 11 by the adhesive agent 14. The scheme for fixing the metal plate 13 is not limited to the above, and the metal plate 13 may be fixed to the surface 11b of the CFRP member 11 by means other than the adhesive agent 14.

Figure 6B:
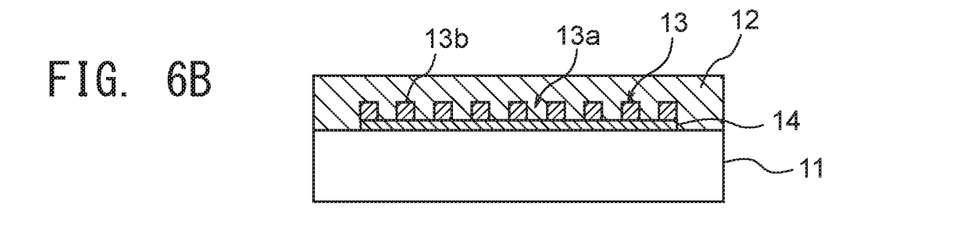
FIG. 6B is a view showing a method of producing the carbon fiber reinforced plastic structure.

Next, as shown in FIG. 6B, the resin layer 12 is formed on the surface 11b of the CFRP member 11 so that the entirety of the metal plate 13 is enclosed by the resin layer 12. The method of forming the resin layer 12 is the same as that of the first embodiment described above. At this time, the resin penetrates into the apertures 13a of the metal plate 13. The portions of the aperture 13a, of which the base is the CFRP member 11, are filled with the resin to form nonmagnetic regions.

Typically, punching is used for forming the apertures 13a in the metal plate 13. When a large number of apertures 13a are formed by punching, the metal plate 13 may be bent or warped. However, by fixing the metal plate 13 to the CFRP member 11 with the adhesive agent 14 and enclosing the metal plate 13 with the resin layer 12 as in the present embodiment, it is possible to minimize the influence of the bending or warp.

Figure 6C:
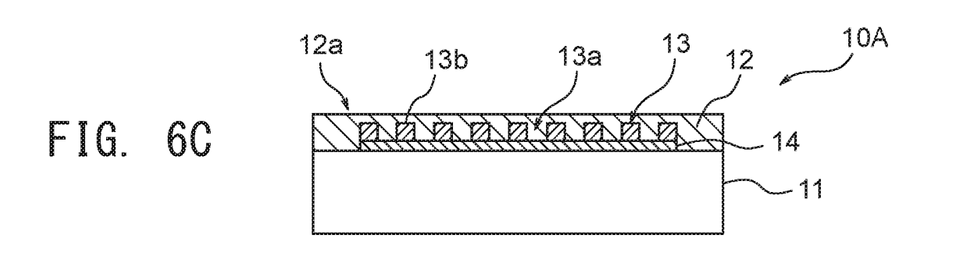
FIG. 6C is a view showing a method of producing the carbon fiber reinforced plastic structure.

Next, as shown in FIG. 6C, the surface 12a of the resin layer 12 is ground so that the surface 12a has a desired surface roughness. FIG. 6C shows a state in which the metal plate 13 is located on the surface 11b of the CFRP member 11 and the resin layer 12 covers the entire surface of the metal plate 13, so that the metal plate 13 is not exposed.

Figure 7:
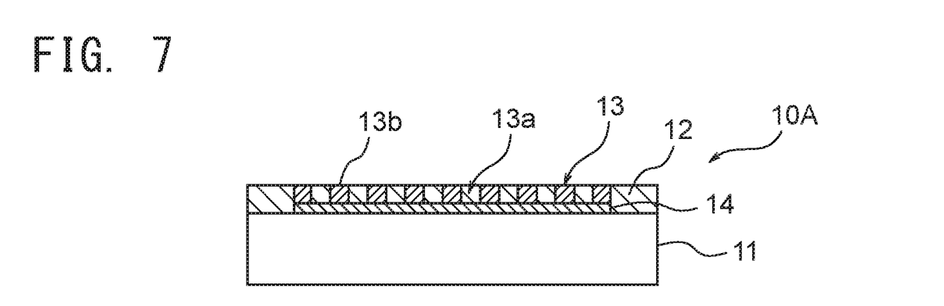
FIG. 7 is a view showing another example of a carbon fiber reinforced plastic structure.

However, the surface 12a of the resin layer 12 may be further ground, and an upper part of the resin layer 12 above the metal plate 13 may be entirely scraped off as shown in FIG. 7. At that time, the metal plate 13 may also be ground. FIG. 7 shows a state in which the metal plate 13 is located on the surface 11b of the CFRP member 11 and the resin layer 12 covers part (side surfaces) of the metal plate 13, so that the metal plate 13 is exposed.

The strength of the magnetic force, which is the driving force for the mobile object 25, depends on the distance between the motor core of the mobile object 25 and the ferromagnetic material (metal lattice 13b) in the sliding surface. The shorter the distance is, the stronger the driving force can be. Therefore, in FIG. 6C, the thinner the resin layer 12 covering the surface of the metal plate 13 (the surface opposite to the surface facing the surface 11b), the better. Furthermore, as shown in FIG. 7, it is more preferable that the upper part of the resin layer 12 covering the surface of the metal plate 13 be completely scraped off.

In the case in which the metal plate 13 is exposed as shown in FIG. 7, if the resin does not enter the apertures 13a of the metal plate 13, the surface cannot be properly ground. Therefore, the resin layer 12 on the metal plate 13 and the metal plate 13 are preferably ground after the entirety of the metal plate 13 having the apertures 13a is enclosed in the resin layer 12 so that the resin is introduced into the apertures 13a, as described above.

As described above, in the present embodiment, the metal plate 13 is located on the surface 11b of the CFRP member 11, and the resin layer 12 is formed to cover the metal plate 13.

Thus, a CFRP structure 10A including a third member made of a material different from resin and CFRP, such as metal, can be produced. By completely enclosing the third member in resin, even if residual stress occurs in the third member, since the subject of grinding is a portion of the resin layer enclosing the third member, no deformation occurs in the third member.

Alternatively, all resin above the third member may be scraped off and the surface of the third member may be ground. In this case, surface processing, such as optical polishing and fine processing, can be directly applied to the third member, and the CFRP structure 10A can be used for one of the functional components used, depending on various applications.

In addition, since a metal lattice 13b in which multiple apertures 13a are arranged in a grid pattern is used as the metal plate 13, the CFRP structure 10A including the metal plate 13 can be used for a sliding surface of an air-floating-type planar stage. In this case, the planar stage has high rigidity with reduced dimensional deformation due to external factors, is light in weight, has reduced deformation due to changes in temperature, and has fine surface roughness.

MODIFICATIONS

In the second embodiment, the metal plate 13 has multiple apertures 13a, but the apertures 13a need not be formed. Multiple metal plates 13 may be disposed on the surface 11b of the CFRP member 11. For example, for an air-floating-type planar stage in which the mobile object moves only in one of the X and Y directions, the sliding surface should have regions of ferromagnetic material (metal regions) equally spaced in one of the X and Y directions. Therefore, in this case, multiple linear metal plates 13 may be arranged at equal intervals on the surface 11b of the CFRP member 11.

Furthermore, although the material of the metal plate 13 is iron in the second embodiment, the material of the metal plate 13 is not limited to this. The material of the metal plate 13 may be appropriately selected depending on the application of the product in which the CFRP structure is used. As a material for the metal plate 13, for example, aluminum, copper, a brass, phosphor bronze, or stainless steel (SUS according to Japanese Industrial Standards) may also be used. For example, when the surface of the CFRP structure is to be used for the sliding surface of a planar stage, iron (pure iron) is used for the metal plate 13 as described above, but when the surface of the CFRP structure is to be used for a mirror of a laser interferometer, aluminum may be used for the metal plate 13.

Furthermore, in the second embodiment, the third member disposed on the surface 11b of the CFRP member 11 is a metal member, but the third member is not limited to being a metal member. For example, the third member may be made of glass or quartz. When the third member is made of glass, the surface of the CFRP structure can be used for a mirror of a laser interferometer. When the third member is made of quartz, the surface of the CFRP structure can be used for a diffraction grating by applying a grating to the third member.

In the above embodiments, the resin forming the resin layer 12 may be a room temperature curable resin, but the resin may be another resin, other than a thermosetting resin. For example, a UV (ultraviolet) curable resin may be used. In this case, a UV curable resin in liquid phase is applied to the surface 11b of the CFRP member 11 obtained by cutting a completed CFRP sheet to a necessary size, and the resin is cured by irradiating ultraviolet light, whereby the resin layer is formed on the surface 11b of the CFRP member 11.

In the above embodiments, the CFRP structure is used for a stage of an exposure apparatus, but the present invention is not limited to this. The CFRP structure can also be used, for example, as a stage of a laser processing apparatus that irradiates a laser beam on a substrate to form via holes while moving the stage that holds the substrate. Alternatively, the CFRP structure can also be used as a stage of a processing apparatus, such as a wafer defect inspection apparatus or a component mounting apparatus.

Although specific embodiments have been described above, the embodiments are merely examples and are not intended to limit the scope of the present invention. The apparatuses and methods described herein may be embodied in forms other than those described above. In addition, omissions, substitutions, and changes can be made appropriately to the above-described embodiments without departing from the scope of the present invention. Such omissions, substitutions, and changes are encompassed in the scope of the claims and their equivalents and are in the technical scope of the present invention.

REFERENCE SYMBOLS

10: Carbon fiber reinforced plastic structure (CFRP structure)
11: Carbon fiber reinforced plastic member (CFRP member)
11a: Prepreg
12: Resin layer
12a: Surface
13: Metal plate
13a: Aperture
13b: Metal
14: Adhesive agent
21: Light irradiation unit
22: Mask
22a: Mask stage
23: Projection lens
24: Workpiece stage
25: Mobile object
100: Exposure apparatus (Processing apparatus)
W: Workpiece

The invention claimed is:

1. A carbon fiber reinforced plastic structure comprising:
a carbon fiber reinforced plastic member having a first surface;
a resin layer formed on the first surface of the carbon fiber reinforced plastic member,
the resin layer having a second surface mounted on the first surface of the carbon fiber reinforced plastic member and a third surface that is opposite to the second surface, the third surface having a surface roughness that is less than a surface roughness of the first surface of the carbon fiber reinforced plastic member, and
a third member composed of a single layer made of a ferromagnetic material that is different from those of the carbon fiber reinforced plastic member and the resin layer, the third member located on the first surface of the carbon fiber reinforced plastic member, the third member having a fourth surface mounted on the first surface of the carbon fiber reinforced plastic member and a fifth surface that is opposite to the fourth surface,
the resin layer being formed on the first surface such that the fifth surface of the third member is not covered with the resin layer and is exposed, the fifth surface of the third member being flush with the third surface of the resin layer.

2. A processing apparatus comprising a workpiece stage for holding and moving a workpiece, the processing apparatus processing the workpiece held on the workpiece stage, the workpiece stage comprising the carbon fiber reinforced plastic structure according to claim 1.

3. A carbon fiber reinforced plastic structure comprising:
a carbon fiber reinforced plastic member having a first surface;
a resin layer formed on the first surface of the carbon fiber reinforced plastic member, the resin layer having a second surface mounted on the first surface of the carbon fiber reinforced plastic member and a third surface that is opposite to the second surface, the third surface having a surface roughness that is less than a surface roughness of the first surface of the carbon fiber reinforced plastic member; and
a third member composed of a single layer made of a material different from those of the carbon fiber reinforced plastic member and the resin layer, the third member located on the first surface of the carbon fiber reinforced plastic member, the third member having a fourth surface mounted on the first surface of the carbon fiber reinforced plastic member and a fifth surface that is opposite to the fourth surface,
the resin layer being formed on the first surface such that the fifth surface of the third member is not covered with the resin layer and is exposed, the fifth surface of the third member being flush with the third surface of the resin layer,
wherein the surface roughness of the third surface of the resin layer is 10 μm or less in both arithmetic average roughness Ra and maximum height of profile Rz.

4. A processing apparatus comprising a workpiece stage for holding and moving a workpiece, the processing apparatus processing the workpiece held on the workpiece stage, the workpiece stage comprising the carbon fiber reinforced plastic structure according to claim 3.

* * * * *